Oct. 28, 1924.  1,513,102
J. R. GAMMETER
METHOD OF MOLDING AND VULCANIZING PNEUMATIC TIRE CASINGS
Filed July 30, 1921
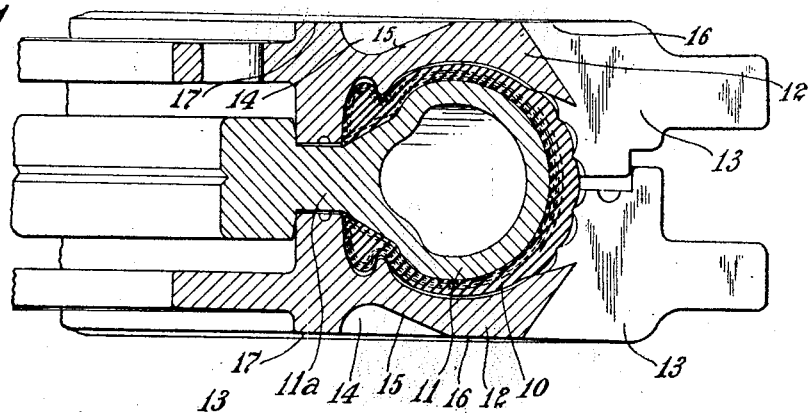
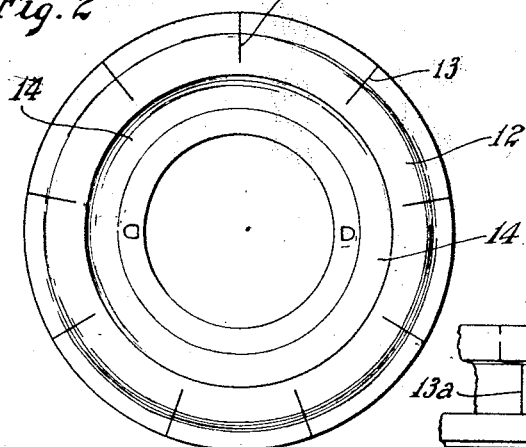
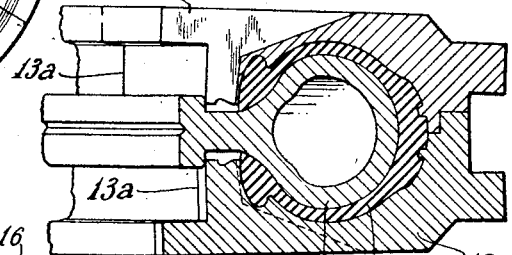
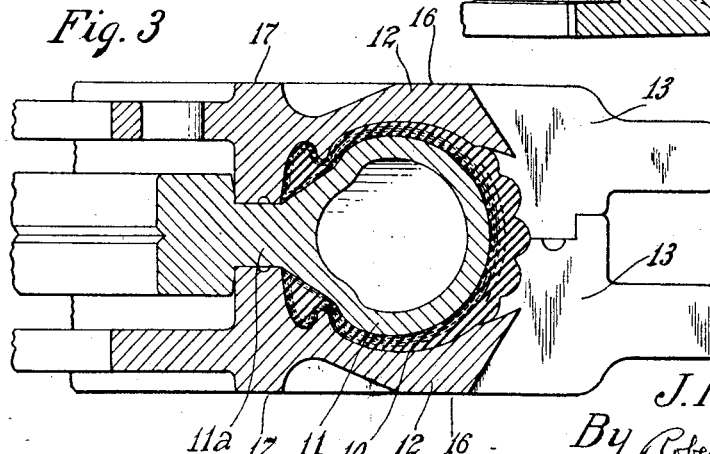
Inventor
J. R. Gammeter
By Robert McPherson
Atty.

Patented Oct. 28, 1924.

1,513,102

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD OF MOLDING AND VULCANIZING PNEUMATIC-TIRE CASINGS.

Application filed July 30, 1921. Serial No. 488,504.

*To all whom it may concern:*

Be it known that I, JOHN R. GAMMETER, a citizen of the United States, residing at Akron, in the county of Summit and State of Ohio, have invented a certain new and useful Method of Molding and Vulcanizing Pneumatic-Tire Casings, of which the following is a specification.

This invention relates to the molding and vulcanizing of pneumatic tire casings on their mandrels in metal molds, and its principal object is to provide an improved method of molding the rubber and compacting the tire without buckling or wrinkling the plies of fabric in the carcass, and without marring the outer surface of the tire, particularly when the molds are heated by surrounding them with steam. It has been customary in the unit-cure method to use either a rigid mold or one of progressively-acting spring construction which closes first at the tread, and to close the mold with heavy hydraulic pressure as fully as possible from the beginning of the heating period, in which case the carcass plies are subjected to heavy displacing strains transmitted from the mold through the comparatively cold and stiff rubber at and in the vicinity of the tread. Or, if the mold is left partly open and the tire remains unsealed therein during the softening stage in the open-steam vulcanizer it is then necessary to remove the water of condensation from between the mold and the tire before fully closing the mold. My invention provides a means for molding the raw tire substantially to its ultimate configuration under a comparatively light pressure in certain portions or in all portions, avoiding the accumulation of water of condensation in the mold and preventing the pocketing of air therein, thus obtaining a more perfect product than heretofore, at no greater cost than in the ordinary unit-cure, full-molding method. My invention also provides for confining the tire more firmly at the beads than at the sides and tread during the molding thereof, while venting the sides of the molding cavity, and it provides other advantages as will more fully appear.

Of the accompanying drawings, Fig. 1 is a transverse sectional view showing a portion of a tire casing on a core in a spring mold of the preferred construction, with the mold slightly open at its inner periphery and further open at the tread, as at the beginning of the initial stage of heating.

Fig. 2 is a plan view of the mold.

Fig. 3 is a view similar to Fig. 1, with the mold fully closed.

Fig. 4 is a view similar to Fig. 1 showing a spring mold of the Swinehart type which closes first at the tread or outer periphery, in which my invention may be practiced in a modified form.

Referring at first to Figs. 1 to 3, 10 is the tire casing composed of the usual carcass made of bias-cut rubberized plies of square woven fabric, or layers of thread or cord, together with bead-cores, breaker-strip and side and tread rubber, the casing in this instance being of the soft-bead clincher type, and the tread having anti-skid projections.

11 is the core or mandrel on which the tire is built up, said core having a suitable body and a tongue portion $11^a$. 12, 12 are the two halves of the mold formed with a molding cavity having the desired configuration for the outer surface of the tire. The tread portions of these mold members are transected by a circumferential series of narrow, radial, registering slots or clefts 13 which divide their periphery into a series of spring segments, and the members 12 are annularly grooved at 14, 14 to form relatively-thin, flexible, hinging portions 15, 15 in their walls over the beads and the adjacent portions of the side walls of the tire. At the molding cavity these slots preferably terminate, as shown, at the margins of the thickest portion or supporting surface of the tire tread, and they extend radially outward to the edges of the mold members and vertically to their upper and lower surfaces. The overflow fins or rands of rubber which exude into these slots during the molding of the tire connect with the median circumferential fin or rand formed at the parting plane, and they remain on the tire when the mold is removed and thus do not clog the slots. These fins and those which form at the inner edges of the tire are omitted in Fig. 3, for convenience of illustration.

The upper and lower pressure-transmitting surfaces 16, 16 of the mold are normally slightly inclined, dished or concavely coned as shown in Fig. 3, so that these surfaces are farthest apart at their outer edges when the mold is not under a closing pressure. 17, 17 are pressure surfaces of smaller diameter which are brought together in adjacent molds or are brought against the press platens, level with the surfaces 16, when sufficient axial pressure is exerted to close the mold as indicated in Fig. 3.

In the preferred mode of practicing my invention, the core 11 with a complete raw tire thereon is placed between the mold members 12, 12, and the best results are obtained if these members are rather hot, when the tire is first placed therein, as they may be from a previous vulcanization when emptied and re-filled promptly after coming from the vulcanizer, the heat having the effect of softening the rubber and initiating the molding operation while the tire and mold are being carried toward and into the vulcanizer. The latter may be an ordinary pot or open-steam vulcanizer equipped with a hydraulic press adapted to receive a stack of molds.

Fig. 1 shows approximately the relation of the parts when the mold is put into the vulcanizer. A stack of molds being located between the press platens and the vulcanizer closed, a relatively light hydraulic pressure is applied in order to close the mold members 12, 12 against the core tongue 11$^a$, firmly anchor the tire casing at its inner periphery or bead edges, and seal the mold against the tire to exclude steam and water of condensation, but this pressure is insufficient to close the mold at its outer periphery. Steam is then turned on to heat the mold, core and tire and cause the rubber to become thoroughly plastic, the steam preferably being at a vulcanizing temperature, although it is not essential that there shall be any substantial amount of vulcanization during the molding stage, the principal object being to cause the rubber to flow and fill all of the molding cavities and the interstices of the fabric before the mold is placed under heavy hydraulic pressure. The tendency of the surface rubber during this stage is to flow toward the middle of the tread, if there is an excess of raw rubber present, and it also swells and thus causes some pressure in the molding cavity so that the rubber at the end of this stage may have a fairly dense texture substantially free from sponginess. The excess rubber, if any, will form overflow fins in the slots 13 and at the parting plane between the mold members during this stage, these fins being trimmed off after the tire has been vulcanized and removed from the mold. The slots 13 perform the important function of venting the sides of the molding cavity so that no air can become pocketed against the sides of the tire and mar its appearance, and they also provide an improved means of disposing of a part of the excess rubber. The initial stage of heating may, if desired, be carried far enough to effect a partial vulcanization of the rubber on the plies of the carcass, or the outer rubber, or both, the carcass rubber in the first case being so compounded that it tends to set or cure before the outer side-wall and tread rubber. At the end of the initial stage, the hydraulic pressure is increased sufficiently to close the spring mold progressively toward and at the tread, and the vulcanization is then carried to completion with the mold thus closed, the temperature being raised, if desired, during this final stage, and the increased pressure serving further to compact the tire.

By way of example, if the total heating period in the vulcanizer is 50 minutes, the initial stage of heating to cause substantially complete molding in the partly-closed mold, may be for a period of 10 minutes without substantial vulcanization, at a steam temperature of about 287° F., or of 20 minutes with partial vulcanization, and the final stage of heating in the fully closed mold may be for 40 or 30 minutes at about 297° F., but these times and temperatures may be varied, especially with different accelerators in the compounds.

As a modification, the mold of Fig. 1 may be substantially closed with full hydraulic pressure as soon as the mold and tire have been introduced into the vulcanizer and the vulcanizer closed.

As a further modification, this type of mold may be left open at its outer periphery, while closed at the beads, throughout the cure.

As another modification, the molding under relatively light pressure may take place in an ordinary mold not having the spring characteristic, but formed with radial venting slots 13 and with permanently parallel upper and lower surfaces as though the mold were made substantially in the form shown in Fig. 3.

As a still further modification I may employ a spring mold of the Swinehart type illustrated in Fig. 4, whose members 12$^a$ are formed with radial slots 13$^a$ at and adjacent to their inner peripheral portions and which close first at the tread and tend to spring open at the beads. The slots in this case preferably are not cut through to the molding cavity and hence do not act as venting and fin-forming channels, but the sides of the molding cavity are vented through its inner periphery along the sides and around the beads of the tire, and any suitable auxiliary vents such as the usual drill holes may be used if desired. The mold is left open at its inner periphery during the initial heating and molding stage, and the swelling of the rubber progressively forces out any air and moisture as the rubber fills up the molding space, after which the mold is progressively closed toward and at its inner periphery, by the application of a sufficient degree of hydraulic pressure on the press ram, and the vulcanization is carried to completion with the mold thus closed.

I claim:

1. The method of molding and vulcanizing pneumatic tire casings which comprises heating the tire on a rigid core in a mold having a cavity of the shape of the tire, maintaining the mold partly open but bearing lightly upon the tire in sealed relation thereto while venting the sides of the molding cavity, until the rubber has softened and taken the shape of said cavity, and vulcanizing the tire while substantially all of its portions are under compression in the mold.

2. A method according to claim 1 in which the mold, during the softening and flow of the rubber, is sprung open more at one periphery than at the other, and is then progressively closed toward and at its first mentioned periphery.

3. A method according to claim 1 in which the mold is closed at the beads and slightly open at the tread periphery during the softening and flow of the rubber.

4. A method according to claim 1 in which the carcass rubber is partially vulcanized without full mold pressure, and the tire is then further vulcanized with the mold substantially fully closed.

5. The method of molding and vulcanizing pneumatic tire casings which comprises heating the tire in an enclosing mold while rigidly supported from the inside, tightly confining the beads, lightly confining the tread and causing a swelling of the softened rubber on the outside of the tire outwardly against the mold while the beads are thus confined.

6. The method of molding and vulcanizing pneumatic tire casings which comprises heating the tire on a rigid core in an enclosing mold having a cavity of the shape of the tire, anchoring the tire first at its bead edges between said core and mold, progressively closing the mold toward and at its tread periphery and vulcanizing the tire while the mold is thus closed.

7. The method of molding and vulcanizing pneumatic tire casings which comprises supporting the tire on a rigid core in a mold having a cavity of the shape of the tire, clamping the bead edges of the tire under substantially full compression between the mold and core, initially heating the tire until the rubber has softened and taken the shape of the mold while maintaining the mold slightly open at its tread periphery, and vulcanizing the tire substantially to completeness by further application of heat while the mold is closed at both peripheries.

8. A method according to claim 7 in which the carcass rubber is partially vulcanized during the initial stage of heating, before closing the mold at its tread periphery.

In witness whereof I have hereunto set my hand this 19 day of July, 1921.

JOHN R. GAMMETER.